US008760449B1

(12) United States Patent
Horvath (10) Patent No.: US 8,760,449 B1
(45) Date of Patent: *Jun. 24, 2014

(54) MULTI-STAGE FIRE SIMULATION

(71) Applicant: Lucasfilm Entertainment Company, Ltd., San Francisco, CA (US)

(72) Inventor: Christopher J. Horvath, San Francisco, CA (US)

(73) Assignee: Lucasfilm Entertainment Company, Ltd., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,418

(22) Filed: Oct. 15, 2012

Related U.S. Application Data (63) Continuation of application No. 12/570,085, filed on Sep. 30, 2009, now Pat. No. 8,289,327.

(60) Provisional application No. 61/146,256, filed on Jan. 21, 2009.

(51) Int. Cl.
| | |
|---|---|
| *G06T 13/60* | (2011.01) |
| *G06T 17/00* | (2006.01) |
| *G06T 13/00* | (2011.01) |
| *G06G 7/48* | (2006.01) |
| *G06T 15/00* | (2011.01) |

(52) U.S. Cl.
USPC .............. 345/419; 345/428; 345/473; 703/6; 703/9

(58) Field of Classification Search
CPC ...................................................... G06T 13/60
See application file for complete search history.

(56) References Cited

U.S. PATENT DOCUMENTS

| | | | |
|---|---|---|---|
| 5,537,641 | A | 7/1996 | Da Vitoria Lobo et al. |
| 5,920,492 | A | 7/1999 | Montag et al. |
| 5,953,239 | A * | 9/1999 | Teixeira et al. ................... 703/6 |
| 6,266,071 | B1 | 7/2001 | Stam et al. |
| 7,472,046 | B2 | 12/2008 | Rasmussen et al. |
| 7,647,216 | B2 | 1/2010 | Bermejo Alvarez et al. |
| 7,747,420 | B1 * | 6/2010 | Rasmussen et al. ............. 703/6 |
| 2003/0017438 | A1 * | 1/2003 | Ebersole et al. ............. 434/226 |
| 2007/0239414 | A1 | 10/2007 | Song et al. |
| 2008/0021679 | A1 * | 1/2008 | Bleiweiss et al. ................ 703/2 |
| 2009/0070079 | A1 | 3/2009 | Harada |
| 2009/0138247 | A1 * | 5/2009 | Chow ................................ 703/2 |

OTHER PUBLICATIONS

Zhu, Yongning, and Robert Bridson. "Animating sand as a fluid." ACM Transactions on Graphics (TOG). vol. 24. No. 3. ACM, 2005.*

(Continued)

*Primary Examiner* — Kee M Tung
*Assistant Examiner* — Zhengxi Liu
(74) *Attorney, Agent, or Firm* — Kilpatrick Townsend & Stockton LLP (57) ABSTRACT

A system includes a computing device that includes a memory for storing a three-dimensional model that represents particles of a coarse fire simulation. The computing device also includes a graphics refiner for producing two-dimensional simulation segments from the three-dimensional model that represents particles of a coarse fire simulation. The separation distance between two or more of the two-dimensional simulation segments is based upon a level of spatial detail provided by the coarse fire simulation. The graphics refiner is configured to separately process the two-dimensional simulation segments to produce a detailed fire simulation.

27 Claims, 7 Drawing Sheets

(56) References Cited

OTHER PUBLICATIONS ("An Introduction to Sampling Theory" http://www2.egr.uh.edu/~glover/applets/Sampling/Sampling.html Archived on Oct. 19, 2007. Retrieved on Feb. 13, 2013 from <http://web.archive.org/web/20071019063459/http://www2.egr.uh.edu/~glover/applets/Sampling/Sampling.html>).*

Lévy, Bruno. "Constrained texture mapping for polygonal meshes." Proceedings of the 28th annual conference on Computer graphics and interactive techniques. ACM, 2001.*

Yu, Yun Wey, et al. "A hybrid 3D/2D finite element technique for polymer processing operations." Polymer Engineering & Science 39.1 (1999): 44-54.*

Wylie, Brian James Nisbet. Application of two-dimensional cellular automaton lattice-gas models to the simulation of hydrodynamics. Diss. University of Edinburgh, 1991.*

Bridson, R., Hourihan, J., and Nordenstam, M. 2007. Curl-noise for procedural fluid flow. ACM Trans. Graph. (SIGGRAPH Proc.) 26, 1.

Chen, J., et al., 1995. Toward interactive-rate simulation of fluids with moving obstacles using Navier-Stokes equations. Graphical Models and Image Processing 57, 107-116.

Chiu, Charles K., "An Introduction to Wavelets," Academic Press, 1992.

Fattal, R., and Lischinski, D. 2004. Target-driven smoke animation. ACM Trans. Graph. (SIGGRAPH Proc.) 23, 441-448.

Fedkiw, R., Stam, J., and Jensen, H. 2001. Visual simulation of smoke. In Proc. of ACM SIGGRAPH 2001, 15-22.

Feldman, B., O'Brien, J., and Klinger, B. 2005. Animating gases with hybrid meshes. ACM Trans. Graph. (SIGGRAPH Proc.) 24, 3, 904-909.

Feldman, B., O'Brien, J., and Arikan, O. 2003. Animating suspended particle explosions. ACM Trans. Graph. (SIGGRAPH Proc.) 22, 3, 708-715.

Foster, N., and Metaxas, D. 1997. Controlling fluid animation. In Comput. Graph. Int., 178-188.

Foster, N., and Fedkiw, R. 2001. Practical animation of liquids. In Proc. of ACM SIGGRAPH 2001, 23-30.

Foster, N., and Metaxas, D. 1996. Realistic animation of liquids. Graph. Models and Image Processing 58, 471-483.

Golub, Gene H., et al., "Matrix Computations" Second Edition, The John Hopkins University Press, 1989.

Gustayson, S. 2005. Simple noise demystified. March.

Harris, M. J. 2003. Real-Time Cloud Simulation and Rendering. PhD thesis, University of North Carolina at Chapel Hill.

Ihm, I., Kang, B., and Cha, D. 2004. Animation of reactive gaseous fluids through chemical kinetics. In Proc. of the 2004 ACM SIGGRAPH/Eurographics Symp. On Comput. Anim., 203-212.

Kass, M., and Miller, G. 1990. Rapid, stable fluid dynamics for computer graphics. In Comput. Graph. (Proc. of SIGGRAPH 90), vol. 24, 49-57.

Lamorlette, A., and Foster, N. 2002. Structural modeling of flames for a production environment. ACM Trans. Graph. (SIGGRAPH Proc.) 21,3,729-735.

McNamara, A., Treuille, A., Popovis, Z., and Stam, J. 2004. Fluid control using the adjoint method. ACM Trans. Graph. (SIGGRAPH Proc.) 23, 3,449-456.

Melek, Z., and Keyser, J. 2005. Multi-representation interaction for physically based modeling. In ACM Symp. on Solid and Physical Modeling, 187-196.

Mihalef, V., Metaxas, D., and Sussman, M. 2004. Animation and control of breaking waves. In Proc. of the 2004 ACM SIGGRAPH/Eurographics Symp. On Comput. Anim., 315-324.

Neff, M., and Fiume, E. 1999. A visual model for blast waves and fracture. In Proc. of Graph. Interface 1999, 193-202.

Nguyen, Hubert, "GPU Gems 3," NVIDIA Corporation, 2008.

Nguyen, D., Fedkiw, R., and Jensen, H. 2002. Physically based modeling and animation of fire. ACM Trans. Graph. (SIGGRAPH Proc.) 21,721-728.

Olano, M. 2005. Modified noise for evaluation on graphics hardware. In Graphics Hardware (2005).

Rasmussen, N., et al., 2004. Directable photorealistic liquids. In Proc. oj the 2004 ACM SIGGRAPH/Eurographics Symp. on Comput. Anim., 193-202.

Rasmussen, N., Nguyen, D., Geiger, W., and Fedkiw, R. 2003. Smoke simulation for large scale phenomena. ACM Trans. Graph. (SIGGRAPH Proc.) 22, 703-707.

Selle, A., et al., 2005. A vortex particle method for smoke, water and explosions. ACM Trans. Graph. (SIGGRAPH Proc.) 24, 3, 910-914.

Shi, L., et al., 2005. Taming liquids for rapidly changing targets. In Proc. of the ACM SIGGRAPH/Eurographics Symp. on Comput. Anim., 229-236.

Shreiner, Dave, et al., "OpenGL Programming Guide Sixth Edition, The Official Guide to Learning OpenGL, Version 2.1," Silicon Graphics, Inc., 2008.

Stam, J., and Fiume, E. 1995. Depicting fire and other gaseous phenomena using diffusion process. In Proc. of SIGGRAPH 1995, 129-136.

Stam, J. 2003. Flows on surfaces of arbitrary topology. ACM Trans. Graph. (SIGGRAPH Proc.) 22, 724-731.

Stam, J. 1999. Stable fluids. In Proc. of SIGGRAPH 99, 121-128.

Steinhoff, J., and Underhill, D. 1994. Modification of the Euler equations for "vorticity confinement": Application to the computation of interacting vortex rings. Phys. of Fluids 6, 8, 2738-2744.

Treuille, A., et al., 2003. Keyframe control of smoke simulations. ACM Trans. Graph. (SIGGRAPH Proc.) 22, 3, 716-723.

Wright, R. et al. OpenGL SuperBible: Comprehensive Tutorial and Reference, 4th Edition. 2007. AddisonWesley.

Yngve, Gary D. et al., "Animating Explosions," Computer Graphics Proceedings, Annual Conference Series, Jul. 23-28, 2000, pp. 29-36.

Zhu, Y., Bridson, R. 2005. Animating sand as a fluid. ACM Trans. Graph. (SIGGRAPH Proc.) 24, 3, 965-972.

* cited by examiner

MULTI-STAGE FIRE SIMULATION

CLAIM OF PRIORITY

This application is a continuation application and claims priority under 35 USC §120 to U.S. patent application Ser. No. 12/570,085, filed on Sep. 30, 2009 (U.S. Pat. No. 8,289,327, to be issued on Oct. 16, 2012), which claims priority under 35 USC §119(e) to U.S. Patent Application Ser. No. 61/146,256, filed on Jan. 21, 2009, the entire contents of which are hereby incorporated by reference.

TECHNICAL FIELD

This document relates to simulating fire using multi-stage processing techniques.

BACKGROUND

In the ever expanding fields of online video applications (e.g., video games) and offline applications (e.g., motion picture and television show production), computer generated simulations are more frequently being called upon to produce breath-taking scenes. Along with being used to produce partial or complete scenes, simulations are also used to allow computer generated graphics to interact with content from captured footage. As such, simulations need to appear photorealistic and believable for every type of viewer. For situations that call for simulated explosions, animations and other fanciful objects that include fire-like features, extremely detailed fire simulations may need to be produced. Computation techniques and methods may be implemented to produce such detailed features. However, significant computational resources and processing time may be required, which may extend or delay production schedules.

SUMMARY

The systems and techniques described here relate to a multi-stage process for producing fire simulations. By processing data with reduced dimensions, various processing techniques may be exploited to increase processing speed while conserving computation resources.

In one aspect, a computer-implemented method includes producing two-dimensional simulation segments from a three-dimensional model that represents particles of a coarse fire simulation. The separation distance between at two or more of the two-dimensional simulation segments is based upon a level of spatial detail provided by the coarse fire simulation. The method also includes separately processing the two-dimensional simulation segments to produce a detailed fire simulation.

Implementations may include any or all of the following features. The level of spatial detail provided by the coarse fire simulation may represent a spatial resolution from a viewing perspective. This separation distance may be at most half of the spatial resolution from the viewing perspective. The simulation segments may be oriented parallel to each other and perpendicular to the viewing perspective. The simulation segments may have various shapes such as a rectangular shape. One or more constraints may be applied to the particles of the three-dimensional model. Various types of constraints may be implemented, for example, one constraint may be associated with the conservation of mass. The resolution of the detailed fire simulation produced from the two-dimensional simulation segments may be higher than the resolution of the three dimensional model. Separately processing the two-dimensional simulation segments may include using a graphical processing unit to process one or more of the two-dimensional simulation segments. Separately processing the two-dimensional simulation segments may include producing two or more images for each two-dimensional simulation segment.

In another aspect, a system includes a computing device that includes a memory for storing a three-dimensional model that represents particles of a coarse fire simulation. The computing device also includes a graphics refiner for producing two-dimensional simulation segments from the three-dimensional model that represents particles of a coarse fire simulation. The separation distance between two or more of the two-dimensional simulation segments is based upon a level of spatial detail provided by the coarse fire simulation. The graphics refiner is configured to separately process the two-dimensional simulation segments to produce a detailed fire simulation.

In another aspect, a computer program product tangibly embodied in an information carrier and comprising instructions that when executed by a processor perform a method that includes producing two-dimensional simulation segments from a three-dimensional model that represents particles of a coarse fire simulation. The separation distance between two or more of the two-dimensional simulation segments is based upon a level of spatial detail provided by the coarse fire simulation. The method also includes separately processing the two-dimensional simulation segments to produce a detailed fire simulation.

Details of one or more implementations are set forth in the accompanying drawings and the description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
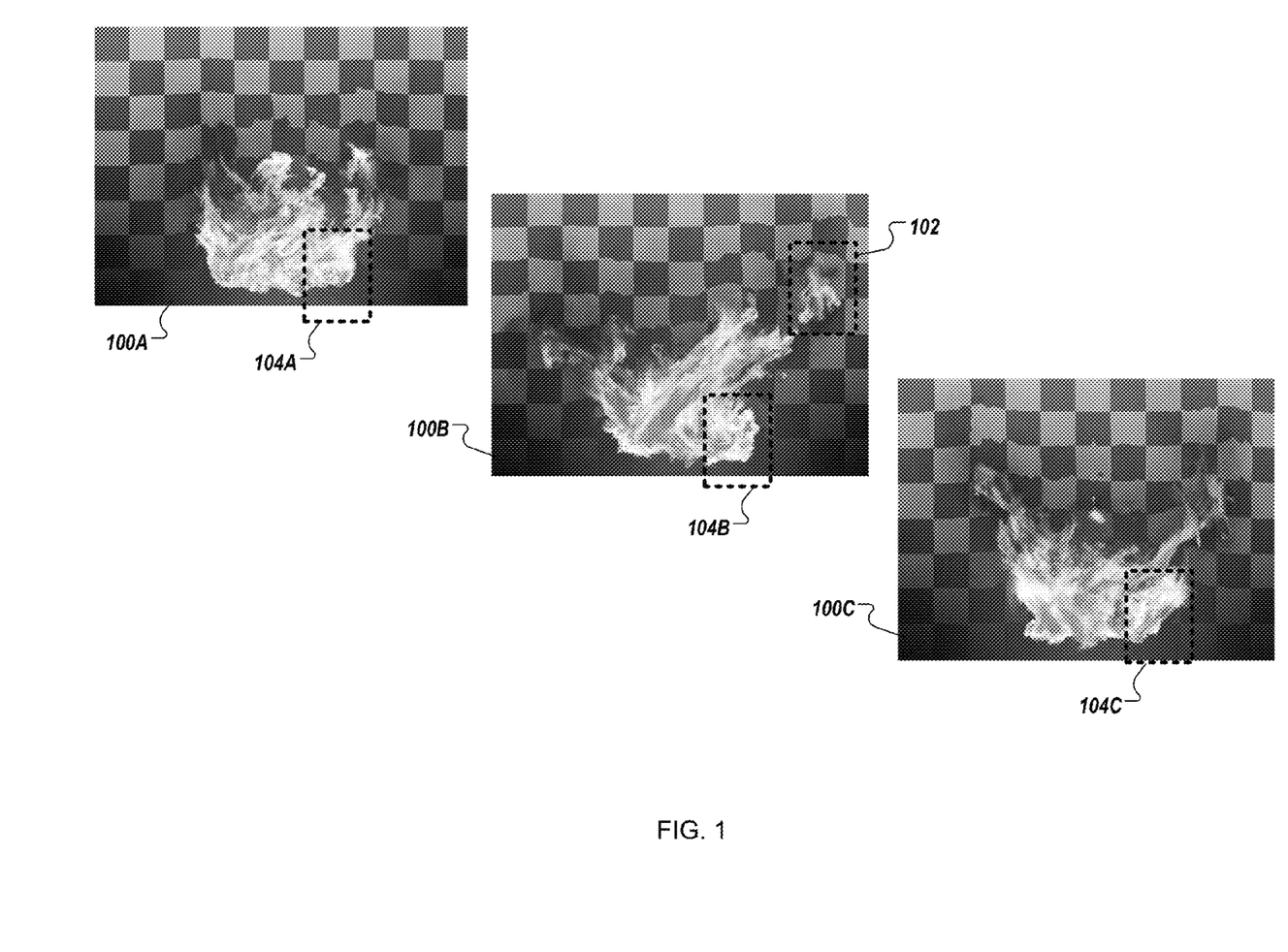
FIG. 1 illustrates a series of simulated fire images.

Referring to FIG. 1, a series of images 100A, 100B, and 100C are illustrated that includes simulated representations of fire at three respective time intervals. Similar to actual fire, simulated fire can visually include small, flickering features with fine details both in time and space. The flickering nature of fire derives from the rapid time-evolution of such features. Also similar to actual fire, simulated fire may also contain larger scale features, for example, large gradients of temperature can produce turbulent, vortical behavior in comparatively calm systems such as campfires or torches. Due to the need to simulate transient fine resolution features (along with larger scale features), large scale combustion simulations may be somewhat intractable for artist-driven, visual effects production applications.

One or more techniques may be implemented to simulate fire for various applications such as motion picture production. For example, in one methodology, extracted fire and smoke elements can be rendered as camera-facing integrated images (referred to as sprites). Such techniques can take advantage of the phenomena that fire and smoke have somewhat amorphous, soft, and rapidly evolving boundaries. Subsequently, compositing of many such filmed elements may provide a near realistic viewing experience. Sprites may generally be large to be visually effective, and typically, filmed elements may not interact with objects that are absent during filming. As such, sprite-based simulation of fire and smoke may lack fine detail, for example, to produce fine tendrils beyond large scale elements. Further, such simulations may lack the visual softness of photo-realistic fire. Additionally, there may be a lack of fluid continuity between sprites.

In some conventional techniques, fire and smoke may be simulated with three-dimensional grids that utilize fluid models. Such simulations may promote interactions with three-dimensional objects, however, such grid-based models may provide limited spatial and temporal resolution. Thus, producing a grid with an appropriate level of detail may be computationally intensive and call for significant resources (e.g., processor time and amounts of memory), thereby increasing production delay.

Similar to naturally occurring fire, the smaller and fine detail features of simulated fire tend to be fast-moving, turbulent and transient compared to larger and coarser features that tend to remain present beyond fractions of a second. For example, as illustrated in the figure, a small transient feature (e.g., highlighted by a box 102) may only appear in one or two frames. Meanwhile, the larger, coarse features subsist substantially independent of the smaller, short-lived features. For example, a coarse feature (e.g., highlighted by boxes 104*a*-*c*) may appear to develop over a series of frames. Based upon this observation, characteristics of the small, short-lived features may be exploited, for certain viewing perspectives, to produce photo-realistic representations of fire in a computationally efficient manner.

In one methodology such computation efficiency may be provided by combining a coarse, three-dimensional grid-based simulation with a set of smaller detailed simulations. By combining the simulations, detailed images of simulated fire may be produced and integrated into film-resolution images in a relatively seamless manner. In one arrangement, the coarse simulation can be initially performed and then used to produce a set of refinement simulations. By producing separate and independent refinement simulations, each simulation may be executed in a computationally efficient manner (e.g., using parallel processing techniques) while still providing a visually cohesive simulation.

Figure 2:
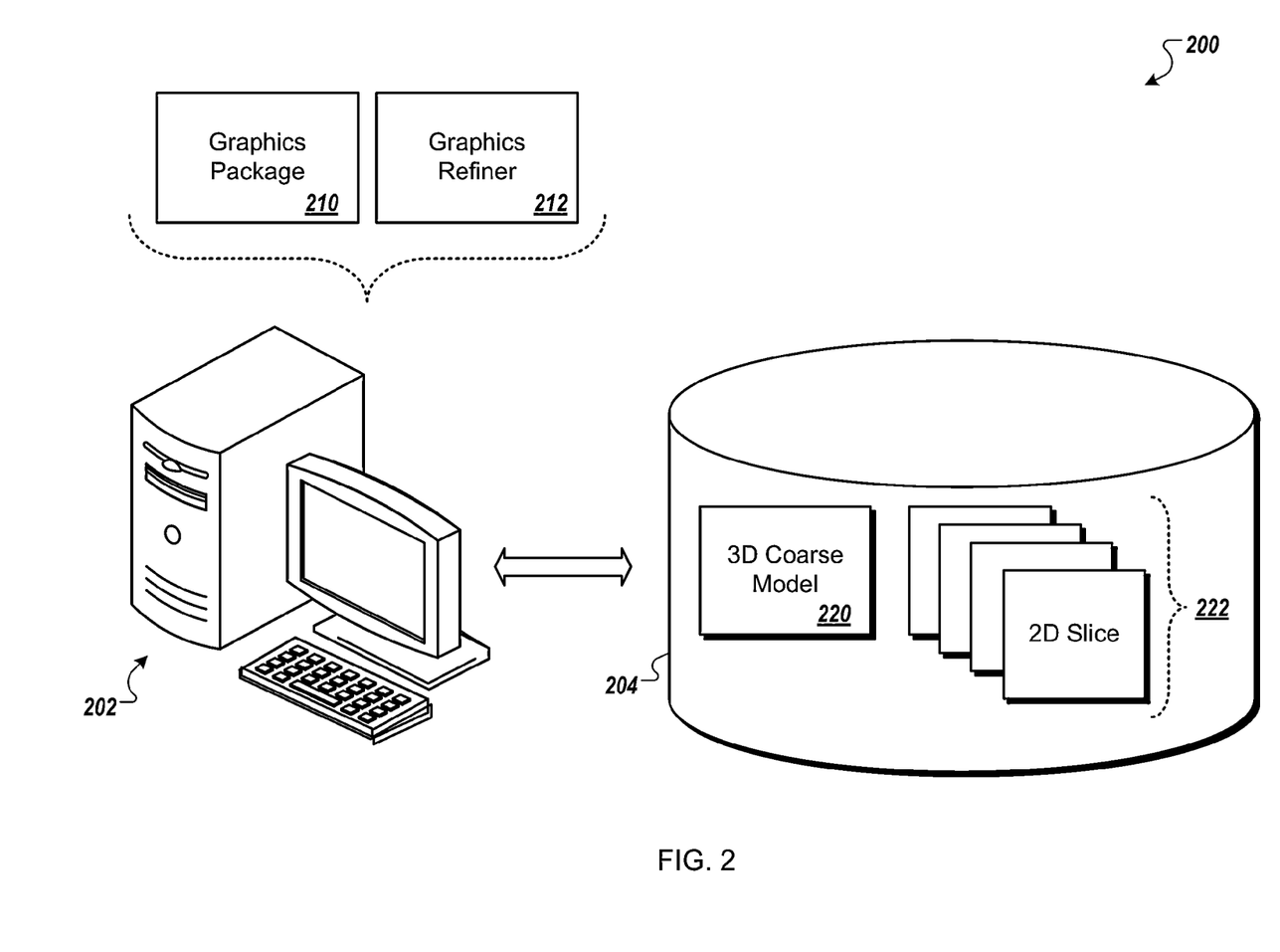
FIG. 2 illustrates a computer graphics processing system.

Referring to FIG. 2, an exemplary computer graphics processing system 200 is capable of performing various operations associated with simulating fire and presenting one or more representations of the simulated fire. For example, operations may be executed in multiple stages by the processing system 200 to provide such simulations. In one arrangement, operations associated with producing a coarse simulation may be initially executed by the processing system 200. For example, a three-dimensional (3D) coarse model 220 of simulated fire may be produced. Once produced, the 3D coarse model 220 can be used to produce refined representations of the simulated fire (from a particular viewing perspective) with reduced dimensions. For example, a series of two-dimensional slices 222 may be produced from the 3D coarse model 220 that allow for efficient processing and production of photo-realistic file simulation.

Along with producing fire simulations, the computer graphics processing system 200 may also perform other operations such as incorporating fire simulations into production projects. For example, fire simulations may be incorporated into video for film, television and internet productions (or other type of offline applications) to provide visually realistic representations. Simulations may also be incorporated into online applications such as video games, virtual environments and other types of media productions. To provide such capabilities, various components and sub-systems may be included in the computer graphics processing system 200. In this particular example, the computer graphic processing system 200 includes a computer system 202 that is in communication with a storage device 204 (e.g., a hard-drive, CD-ROM, etc.). The computer system 202 may include one or more components such as processing devices (e.g., one or more microprocessors), input devices (e.g., computer mice, tablets, keyboards, etc.), output devices (e.g., displays), and memory (e.g., random access memory (RAM), dynamic RAM (DRAM), etc.).

To provide various operations, the computer system 202 may include one or more software modules for producing the fire simulations along with providing other functions. In this arrangement, a graphics package 210 and a graphics refiner 212 are executed by the computer system 202, however, in some arrangements, the functionality of one or both of the modules may be incorporated into a hardware system or a combination of hardware and software. Further, while two distinct modules (e.g., the graphics package 210 and the graphics refiner 212) are illustrated, the functionality of the modules may be combined into a single module or distributed across additional modules (e.g., three or more). The computer system 202 may also execute additional software modules for functions associated with fire simulation production and presentation (e.g., storage, retrieval, updating operations, etc.) and other unrelated operations.

In general, the graphics package 210 enables a user (e.g., graphic artist, illustrator, developer, etc.) to produce, edit and manage simulations. For example, the graphics package 210 may provide an interface for creating, manipulating, and organizing one or more simulations and data associated with simulations. In one arrangement, a user of the graphics package 210 can retrieve simulation models and/or model inputs from a library (e.g., the storage device 204), allow the models to be manipulated (e.g., by the user), and store created, modified, or combined simulations into the library.

One or more processing techniques may be used to produce fire simulations with the graphics package 210 and the graphics refiner 212. For example, two operational stages may be provided by the graphics package 210 and the graphics refiner 212. In the first stage, the graphics package 210 may be used to produce a coarse 3D model representative of fire. Along with having relatively low resolution, the coarse model may be absent some or all of the transient features of the fire. As such, the 3D coarse model may include the physically larger fire features that are visually present for longer periods of time compared to the time periods that the transient features evolve. For the second stage, the coarse 3D model can be provided to the graphics refiner 212 (e.g., retrieve the 3D coarse model 220 from the storage device 204) for processing to provide the refined level of detail and increased resolution needed for the transient features. For example, computationally intensive transient fire features may be combined with the larger features of the simulation for presentation.

In some implementations, the graphics package 210 can operate in association with a controllable particle simulation toolset (e.g., Maya®, SoftImage®, Houdini®, etc.) to enable a user (e.g., a graphic artist) to create a particle simulation having a visually plausible fluid-like motion. For example, the simulation may be directable by the user, and may add one or more steps that allow selected fluid characteristics (of fire) to be approximated and applied to the particles in a controlled fashion. In one arrangement, the particle simulation may be executed with the particles represented on a three-dimensional grid. By using such a grid (or a similar coordinate system), approximate velocities (e.g., non-divergent) and positions of the particles may be determined. For some situations, as the velocities are determined, a selectable amount of viscosity may be simultaneously added. Further, vorticity of the particle system may be selectively amplified based upon the scale of detail. In general, the three-dimensional grid sizes may be relatively coarse with an equivalent length along each grid axis (e.g., 50×50×50 points or smaller). Additionally, in some implementations, the particle simulation may include a relatively small number of particles (e.g., 20,000 to 100,000) for each time instance (e.g., per frame) for use in subsequent refinement. As such, the particles of the coarse simulated (e.g., the 3D coarse model 220) allow broad, directed motion of large features to be captured and used by the graphics refiner 212 for executing operations for adding fine detail in the subsequent refinement stage.

One or more characteristics and properties may be used to define individual particles, for example, in one implementation individual particles may be defined by vector attributes (e.g., position, velocity, etc.) and by scalar attributes (e.g., radius, fuel, mass, impulse, age, validity, etc.). Boolean values may also be used for defining particles, for example, one Boolean value (e.g., validity) may indicate whether a particular particle is participating in a simulation at any particular time. The fuel, mass, and impulse attributes may be normalized values that may indicate the contribution of each particle to fuel, density, and momentum stages of a secondary refinement simulation (provided by the graphics refiner 212). For example, a value of zero may represent no contribution, and a value of one may represent a full contribution. In some implementations, a particle simulation may also include obstacles and disturbances. For example, some particles may be defined as having non-zero values for impulse, thereby allowing the particles to affect coarse simulation movement. Such particles may also be assigned zero values for fuel and mass such that no fuel or density are to be added during the refinement processing of the particles (provided by the graphics refiner 212).

To simulate motion, the positions and velocities of the movable particles represented in the coarse three-dimensional grid may be adjusted over time. For example, particle position and velocity may be sequentially altered over a series of time intervals (e.g., 1/24th of a second, 1/25th of a second, 1/30th of a second, 1/50th of a second, 1/60th of a second, etc.). For such adjustments, various techniques may be used to determine particle positions and velocities for each time interval. For example, particle information and situational information (e.g., particles emission and destruction, forces gathered from fields and collisions, user-defined update rules, etc.) may be used to determine updated particle velocities. One or more time integration schemes (e.g., a Forward-Euler time integration scheme) may then be used with the updated velocities to produce corresponding updates of particle positions. Other parameters and phenomena may also be represented and used (e.g., by the graphics package 210) to determine particle velocities and positions. For example, viscosity may be selectively introduced, for each time interval, e.g., by controlling the transfer of velocities to the particles. In some arrangements, user input received by the graphics package 210 may factor into the introduction of viscosity. For example, vorticity may be amplified or dampened based upon user input. User input (e.g., through interactions with the graphics package 210) may also directly or indirectly adjust particle velocities and positions to produce a desired effect. For example, one or more artificial velocities may be assigned to one or a group of particles by a user. Similarly, the positions of individual particles or particle groups may be user adjusted by implementing one or more techniques (e.g., introducing one or more offsets).

Along with allowing a user to directly adjust particles or groups of particles, one or more rules, conditions, etc. may be provided (e.g., the graphics package 210) for particle adjustments. For example, for each time interval, one or more constraints (e.g., conservation of mass, conservation of momentum, incompressibility, etc.) can be applied to a particle system. Along with particle velocity and position information, other information (e.g., related to fuel, impulse, vorticity, viscosity, etc.) that may or may not be user-provided may be used to apply one or more constraints to provide fluid-like behavior of the coarse fire simulation (e.g., the 3D coarse model 220). In one implementation, constraints are applied for each time interval being represented with the 3D coarse model 220. As such, a user (e.g., a graphic artist, graphic designer, etc.) may use the computer graphics processing system 200 to achieve desirable motion of the coarse simulation. For example, a user can direct the computer system 202 to perform one or more iterations to simulate the motion of a coarse representation of fire over a period of time. Once produced, the user can also select the coarse simulation (that exhibits desired characteristics) for refinement (e.g., by the graphics refiner 212).

In some implementations, representations of a coarse particle simulation (e.g., 3D coarse model 220) and related information (e.g., constraints) can be stored (e.g., in the storage device 204) prior to executing operations associated with the subsequent refinement stage. To exchange data and information between the computer system 202 and the storage device 204, various communication techniques may be implemented. For example, hardwire or wireless techniques (or a combination of wired and wireless techniques) may be implemented that use one or more appropriate protocols.

One or more refinement simulations can be based on a coarse particle simulation (e.g., the three-dimensional coarse model 220). For example, the computer system 202 can employ the graphics refiner 212 to generate one or more refined simulations guided by the three-dimensional coarse model 220. The refinement simulations may be directed to follow aspects of the coarse simulation. As such, the refinement simulation(s) can provide a higher level of detail to the coarse simulation, and a composite rendering (e.g., produced by the graphics package 210) can be considered a product of the coarse and refined simulations. For example, when generating a fire simulation, the coarse simulation may provide general motion, yet contain relatively few fine details or fire-like behavior. High-resolution details and fire-related physics can be resolved at a refinement stage.

In general, the fluid-like motion of the large, coarse features may contribute to the behavior of the simulated fire in all directions. However, the high level detail features that are directed perpendicular to the projection plane (e.g., from a camera viewpoint) may not significantly contribute to the behavior and may be downplayed or outright disregarded. As such, the high level detail features may be generated in the spatial dimensions parallel to a projection plane. Thereby, when generating a simulation of fire, fine details perpendicular to the projection plane may not significantly contribute to overall flow behavior, and may not be significantly perceptible to a viewer of the simulation. Disregarding flow continuity between refinement simulations in the direction parallel to a projection axis (e.g., from the camera viewpoint) may enable a user of the computer graphics processing system 200 to process one or more refinement simulations as a set of two-dimensional slices 222 that have a perspective parallel to the projection plane (e.g., facing the camera). For example, the computer system 202 running the graphics package 210 and graphics refiner 212 may sample the three-dimensional coarse model 220 and produce the set of two-dimensional slices 222 that represent refinement simulations based on the coarse simulation.

In some arrangements, the refinement simulations (e.g., the two-dimensional slices 222) may have minimal or no interaction with each other. As such, parallel processing techniques may be employed (e.g., by the computer system 202) for processing the simulations (e.g., by using multiple processors, multithreading techniques, etc.). For example, the two-dimensional slices 222 may be processed by one or more graphics processing units (GPUs) that use a combination of geometry-based graphics processing operations and general purpose graphics processing computing techniques. By employing specialized graphics hardware to perform calculations, parallelisms inherent to the GPU hardware may be taken advantage of and speed improvements may be achieved (e.g., a 20× to 40× improvement over a central processing unit (CPU) implementation may be attained, and a 100× improvement may be possible). For example, refinement simulations associated with the two-dimensional slices 222 may be performed with vertex shaders and fragment shaders. Vertex shaders may be used to transform particle points or slice corners into an appropriate rasterization space. Fragment shaders may be used to control pixel and texture data during a rasterization stage. In some arrangements, a fragment shader and rasterization process may be controlled through an alignment of textured polygons such that texture maps can be treated like input data arrays, while the final display can be treated like an output data array. Although arrangements using GPU devices may enable a reduction in processing delay while providing high resolution, CPU devices may also be used, or any other processing device, or combination of processing devices.

In some implementations, processing of refinement simulations may be executed in parallel with the generation of a coarse simulation. For example, at each of a series of time intervals, particle data related to a coarse simulation (e.g., the 3D coarse model 220) can be used by the computer system 202 to produce a set of refinement simulations (e.g., the 2D slices 222). For low resolution applications (e.g., video games, virtual environments, etc.), a composite fluid simulation may be produced or rendered (e.g., from a coarse simulation and a series of refined simulations) substantially in real-time.

Figure 3:
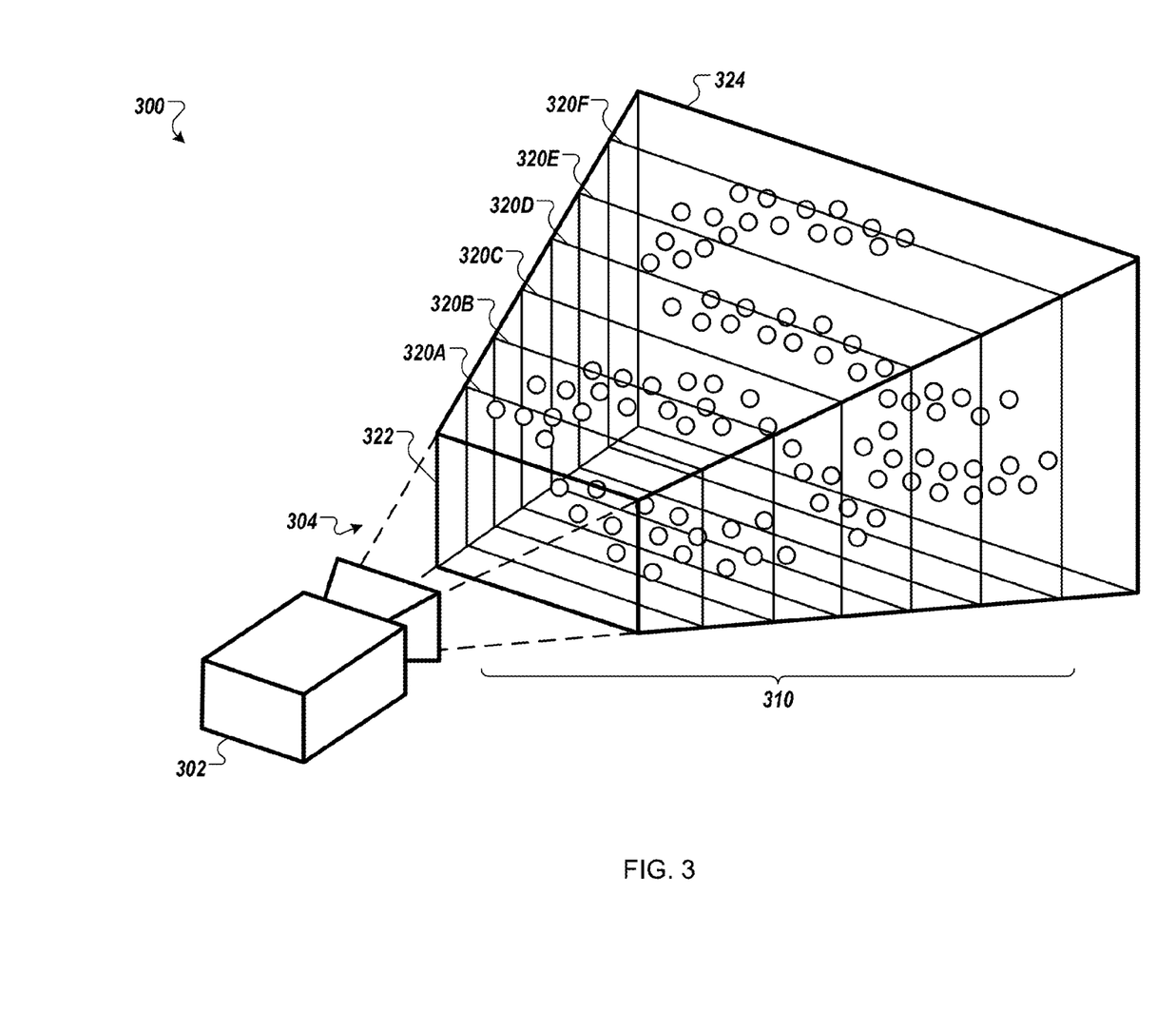
FIG. 3 illustrates sampling a three-dimensional model.

Referring to FIG. 3, one or more techniques and methodologies may be implemented by the graphics refiner 212 to provide a refinement stage and corresponding operations. For example, particles associated with a coarse particle simulation (e.g., 3D coarse model 220) may be represented in a series of two-dimensional slices (e.g., 2D slices 222). The graphics refiner 212 may process the two-dimensional slices such that one or more images are produced for rendering one or more fire simulations. For example, as illustrated in the figure, a portion of a three dimensional coarse simulation 300 includes a set of particles 310 whose characteristics represent the fluid-like behavior of large, coarse fire features. From the particles 310 and associated information, 2D slices may be produced for refinement operations.

In this illustration, a camera 302 represents a particular viewing perspective and defines a view frustum 304 that contains the set of particles 310. In general, simulated fire may be provided by globally preserving fluid-like behavior of the large, coarse fire features provided by the particles 310, and, the fine feature details represented in spatial dimensions that are parallel to the projection plane. As such, fine feature details of the fire perpendicular to the projection plane may be substantially downplayed or ignored. Generally, perpendicularly projecting details do not significantly contribute to the overall flow behavior of the fire, and the system of underlying particles (e.g., particles 310) represent the coarse, global flow behavior. As such, flow continuity of high resolution features in the direction of the projection axis may not be considered of significant concern.

To provide high-level details that are parallel to the projection plane, a series of parallel slices 320A, 320B, 320C, 320D, 320E, 320F are produced that reside between two surfaces 322, 324 (e.g., one defining nearer position to the viewing camera 302 and one defining the distant position from the viewing camera). To represent fire features on each of the slices, one or more techniques may be implemented, for example, particles within the view frustum 304 may be projected on each of the slices. To provide such projections, techniques such as interpolation (e.g., an interpolating spline), curve fitting, and other similar processes may be implemented. Further, such projection techniques may be used to project particles onto slices associated with a particular time instance. As such, a set of slices may be produced for time intervals for rendering simulations over a period of time. Various types of information may be used for particle projection and may also be associated with one or more slices. For example, information such as particle position, velocity, radius, fuel, mass, impulse, age and validity may be used for calculating projections. In typical arrangements, such particle information is provided from the production of the coarse model simulation. For example, particle information may be provided by the graphics package 210 (or other similar software package).

One or more techniques may use the particle information to associate the information with one or more slices (e.g., slices 320A-F). For example, each particle's contribution to the slice may be based upon the distance (e.g., perpendicular distance) between the particle and the slice. As such, the influence of particles may decrease as the separation distance increases. To reduce the influence of more distant particles, techniques such as weighting techniques may be implemented. For example, one or more weighting kernels, may be applied to particles based upon separation distance (to the respective slices) such that influences from neighboring slices are reduced, thereby preventing simulations in adjacent slices from diverging by significant amounts.

Along with projecting particles onto 2D slices (e.g., slices 320A-F), other operations may be provided (e.g., by the graphics refiner 212) for the refinement simulation stage and to resolve the high-resolution fire details. For example, changes in temperature may be simulated to account for the temperature of the projected particles. Further, with the passing of time, temperatures represented in the 2D slices may be adjusted to reduce (absent the introduction of additional particles or other temperature increasing phenomena). Along with changes in temperature, other properties may also experience changes with time, for example, the graphics refiner 212 may simulate reductions in particle density over time (e.g., as particles expand). Dissipation of particle mass and fuel may also be simulated by the graphics refiner 212. While conditions and constraints (e.g., particle collision constraints) are typically applied during the production of the 3D coarse model, some may be applied during the refinement stage. For example, edge boundary conditions may be applied to one or more 2D slices by the graphics refiner 212.

One or more methodologies may be used by the graphics refiner 212 to represent the motion of particle properties and other fluid-like characteristics of fire represented in the 2D slices. For example, temperature, texture, fuel and velocity characteristics may be advected by operations of the graphics refiner 212. Generally, the fluid motion in advection may be described mathematically as a vector field, and the content transported described as a scalar concentration of substance, which is contained in the fluid. In one arrangement, a semi-Lagrangian advection technique may be used to provide advection in a substantially stable manner. Other operations may also be provided by the graphics refiner 212 during the refinement stage. For example, calculating and applying one or more damping coefficients to particle velocities, and calculating voracity parameters such as confinement may be provided. Turbulence may be added to velocity data along with data representing thermal buoyancy. One or more techniques may also be used by the graphics refiner 212 to enforce velocity incompressibility. For example, a Jacobi solver may be included in one enforcement technique.

As mentioned, processing of each of the 2D slices 320A-F may be provided by one or more GPUs, CPU's or a combination of processing devices. In one arrangement, a GPU may be dedicated to computing each slice, and correspondingly store the 2D slices into one or more storage devices (e.g., storage device 204). Additionally, the 2D slices may be used for producing images for rendering the simulated fire. In some arrangements the information provided by the 2D slices may be converted for rendering, for example, density, temperature, texture and fuel information may be converted into data that represents light and opacity levels. In one arrangement, light is calculated from temperature information using one or more models (e.g., a blackbody radiation model). Similarly, opacity may be calculated from the density information, the spacing between the 2D slices and one or more mathematical models (e.g., an exponential function). User input may also be accepted by the graphics refiner 212 for adjusting light and opacity levels for aesthetic effect. Optical effects such as motion blur may also be provided from the stored information such as from velocity information.

The separation between each of the 2D slices (e.g., slices 320A-F) can be considered a sampling interval of a 3D coarse model along the direction of view of the camera 302 (referred to as the projection axis). As such, spatial characteristics along the projection axis may depend, at least in part, upon the separation of the slices. To set the separation distance, and correspondingly set the spatial resolution of features along the projection axis, one or more techniques may be implemented. For example, the Nyquist sampling limit may be used to define the spatial resolution. In general, to achieve a particular minimum spatial resolution, the separation of the 2D slices is set to be at least half of that spatial resolution. For example, to resolve spatial details on the order of one inch, the separation of the 2D slices must be half of one inch or less. As such, a factor of one half of the desired spatial resolution is sufficient, however, in some arrangements a factor of one fourth (e.g., ¼) of the desired spatial resolution, or half the Nyquist sampling limit, is used to provide over-sampling along the projection axis.

As mentioned, since the high-resolution fire details directed along the projection axis may be downplayed or ignored, the large scale features of the fire simulation are used to define the Nyquist sampling limit. As such, the spatial resolution of the 3D coarse model (along the projection axis) may be used to define the separation of the 2D slices. By using the relatively larger spatial features to define the spatial sampling interval, a reduced number of 2D slices are needed (compared to defining the sampling interval by the high resolution feature details of the 2D slices).

While the Nyquist sampling limit has been discussed with respect to the defining the separation between the 2D slices, other techniques may also be used independently or in concert with the Nyquist sampling limit technique. Aesthetic considerations may influence the sampling interval of a particle simulation, for example, as specified by a user (e.g., a graphic artist or illustrator, etc.) of the computer graphics processing system 200. For example, the behavioral complexity of a simulation may be subjectively measured and approximated. For a relatively simple fire model (e.g., a fireball, a torch, etc.), a relatively small number of slices may be needed (e.g., 16 to 32 slices) to provide an appropriate level of spatial resolution. For a relatively complex model (e.g., a fire tornado, a tunnel of flame, etc.), a larger number of slices may be implemented (e.g., 500 to 2000 or more) for representing the fire features. To quantify slices for an intermediate, moderately complex model, a number on the order of 96 to 128 slices may be implemented to provide reasonable resolution.

In this example, the 2D slices are generally rectangular in shape, however, one or more other geometries may be implemented. Also, the spacing of the 2D slices 320A-F in this example are illustrated as being uniform. However, in some implementations, non-uniform spacing may be implemented which may effect the spatial resolution along the projection axis.

Once produced, the 2D slices may be used by the graphics refiner 212 to generate a refinement simulation by utilizing one or more techniques and methodologies. For example, a Navier-Stokes simulation may be performed on the independent, two-dimensional data provided by each slice. Due to their independent nature, each 2D slice may contain high resolution data (e.g., 2048×2048 resolution). In one arrangement, the graphic refiner 212 uses a solution to the incompressible Navier-Stokes equations to compute the two-dimensional fluid simulation. Further, the simulation may operate in a iterative manner to produce an output for each slice across a series of time intervals that define a time period.

To provide the Navier-Stokes simulation, the graphics refiner 212 may be provided various particle information as input to the simulation. For example, for each 2D slice, particle information such as particle fuel, particle mass, particle age, particle weighted velocity, etc. may be provided. From the input data, a simulation state may be produced that represents multiple properties of the simulation. For example, simulation state may include such properties as density, temperature, texture, fuel, velocity, artificial pressure, etc. From the simulation state properties, the graphics refiner 212 may provide various types of output. For example, for each 2D slice, two output images can be produced that contain multiple channels of data. Generally, the spatial resolution of the output images is equivalent or nearly equivalent to the 2D slices. In one arrangement, one of the two images contains four channels of simulated data (e.g., density, temperature, texture detail, fluid fuel). The second image may contain channels of two dimensional data such as velocity data (e.g., velocity along a first dimension, velocity along a second dimension). By using both images, the graphics refiner 212 (or another process) may produce one or more renderings of fire for presentation.

Figure 4:
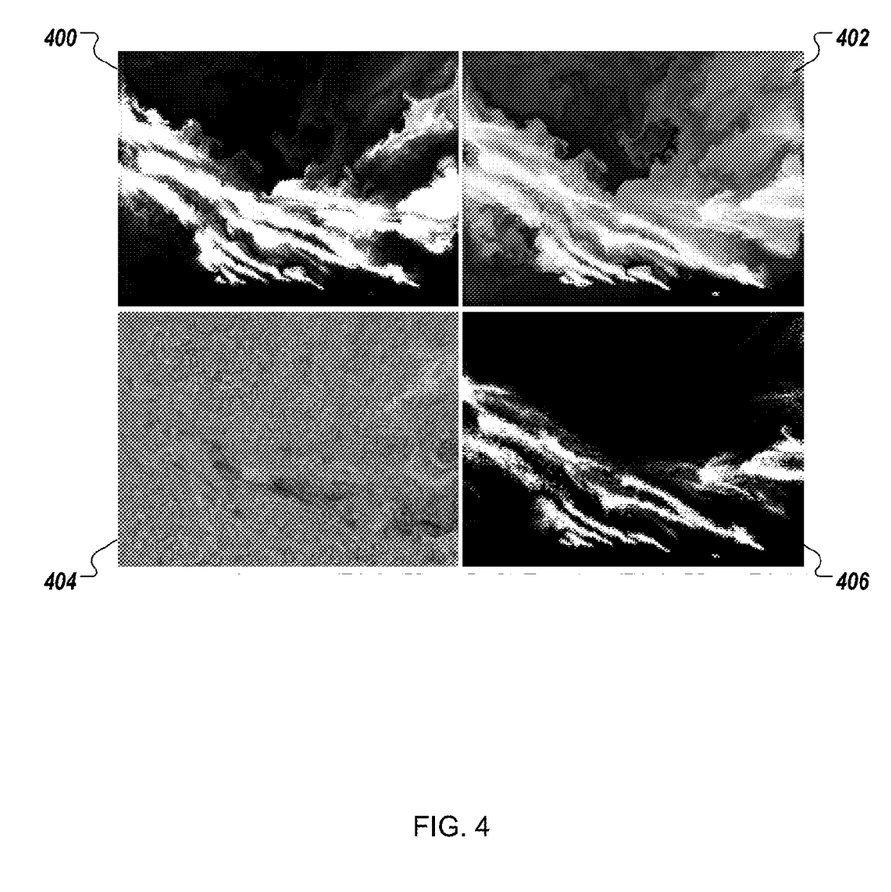
FIGS. 4 and 5 illustrates information associated with two-dimensional slices.

Referring to FIG. 4, four images are illustrated that respectively represent four data channels associated with one image produced by the graphics refiner 212 during a refinement simulation of one 2D slice. One image 400 represents density information while a second image 402 represents temperature information. In a similar manner, an image 404 represents texture data and an image 406 represents fuel information associated with the simulation. While the FIGS. 400-406 represent four data channels of simulation data associated with an output image, in some arrangements, more or less channels of data may be utilized for an image.

Figure 5:
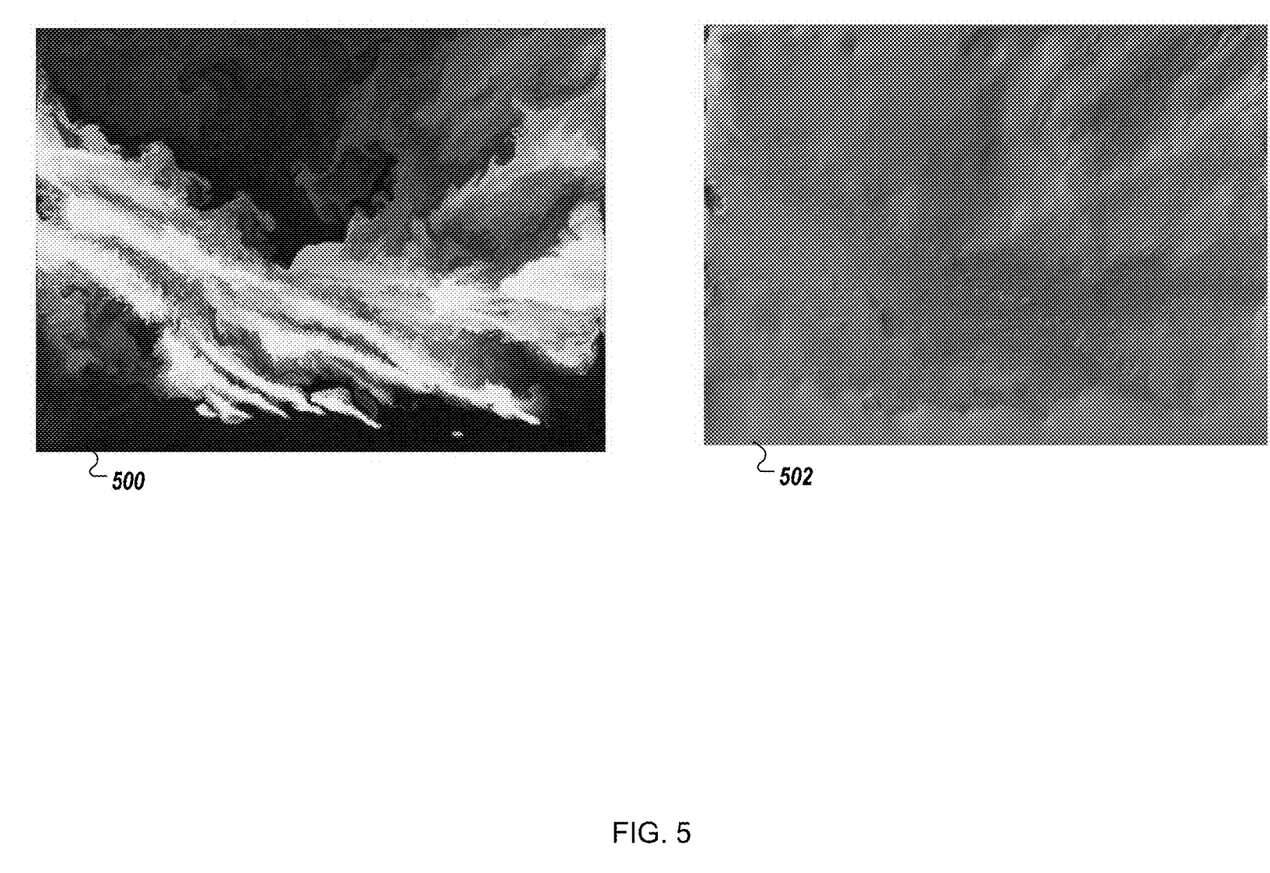

Referring to FIG. 5, by combining the four data channels (e.g., density, temperature, texture and fuel) respectively shown in the images 400-406 (in FIG. 4), a single image 500 represents the fire features provided by the combined content of the channels. Also illustrated in the figure, an image 502 represents the second image output from the graphics refiner 212, which contains velocity data. In this particular example, the image 502 illustrates two velocity data sets that represent velocity in two dimensions.

Figure 6:
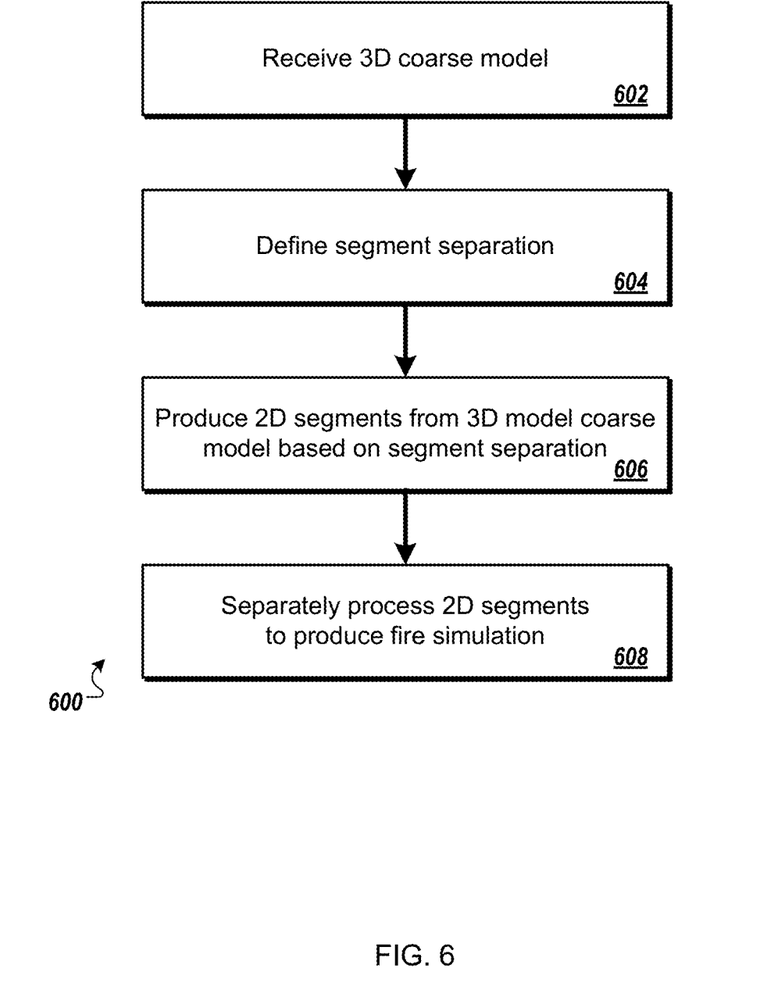
FIG. 6 is a flowchart that represents operations of a graphics refiner.

Referring to FIG. 6, a flow chart 600 represents some operations of the graphics refiner 212. The operations may be executed by a single computing device such as a computer system (e.g., the computer system 202), one or more processors (e.g., a GPU) or other types of devices. In some arrangements multiple computing devices may also be utilized. Along with being executed at a single site (e.g., at one computer system), operation execution may be distributed among two or more sites.

Operations may include receiving 602 a coarse three-dimensional model such as the 3D coarse model 220. The 3D coarse model may represent the relatively large fluid-like features of a fire and may be developed by a graphic artist or illustrator (e.g., by using a software platform such as the graphics package 210). Operations of the graphics refiner 212 may include defining 604 a separation distance for segmenting (e.g., slicing) the 3D coarse model into a series 2D segments. Various techniques and methodologies may be used for determining the segment separation. For example, the Nyquist sampling limit along with a particular spatial along the projection axis (from a particular viewing perspective) may be used. While a single separation distance is typically defined for producing a series of parallel, adjacent and evenly spaced two-dimensional planes, multiple segment separations may also be selected. Along with objective factors (e.g., provided by the Nyquist sampling limit), subjective factors for providing a particular artistic look and feel to the simulation may also be integrated into the segment separation determination. Once determined, operations may include producing 606 a series 2D segments from the 3D coarse model based upon the determined segment separation. Typically the produced 2D segments are orientated perpendicular to a projection line originating from a particular view point (e.g., represented in FIG. 2 with camera 302). Operations may also include separately processing 608 each 2D segment to produce a fire simulation. For example, one or more images may be efficiently produced for each 2D segment by the graphics refiner 212 for rendering a visually cohesive composite fire simulation that includes a range of features.

To perform the operations described in flow chart 600, or other operations of the graphics refiner 212 or the graphics package 210, one or more computing devices may be implemented. For example, a computer system such as the computer system 202 (shown in FIG. 2) may execute such operations and may include a processor or multiple processors (not shown), a memory (not shown), a storage device (e.g., the storage device 204) and an input/output device. Each of the components may be interconnected using a system bus or other similar structure. The processor or processors may be capable of processing instructions for execution within the computer system 202. In one implementation, one (or more) of the processors is a single-threaded processor, however, one or more multi-threaded processors (CPUs, GPUs, etc.) may be used in other implementations. The processor or processors may be further capable of processing instructions stored in memory or on a storage device (e.g., the storage device 204) to display graphical information such as rendering a fire simulation for a user on an input/output device.

Figure 7:
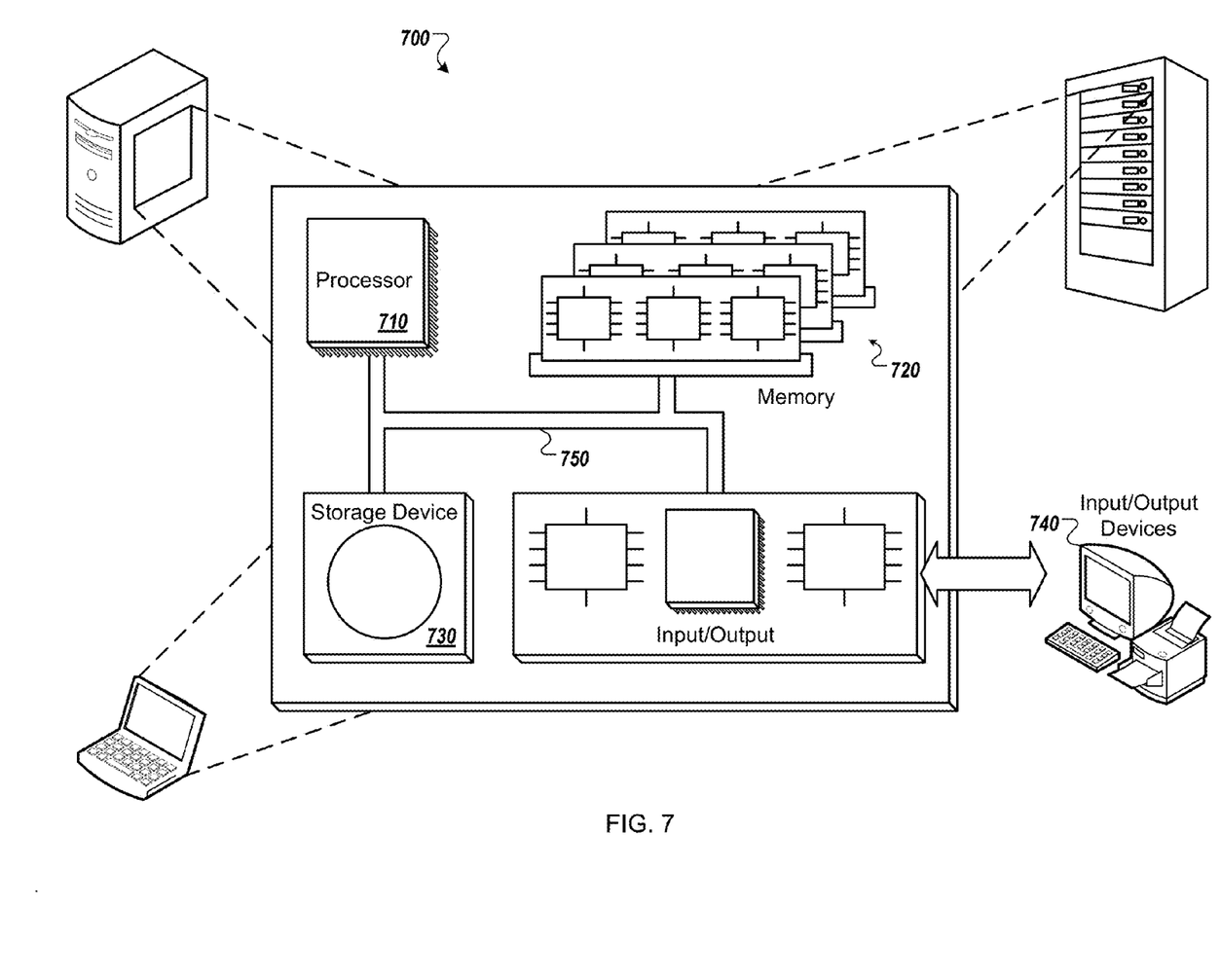
FIG. 7 represents a computer system and related components.

FIG. 7 is a schematic diagram of a generic computer system 700. The system 700 can be used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 is a volatile memory unit in some implementations and is a non-volatile memory unit in other implementations.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Exemplary processors for program instruction include, but are not limited to, one or more central processing units and graphics processing units. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
receiving a three-dimensional (3D) coarse model that includes particles used in a coarse fire simulation at a first resolution, wherein individual particles in the model comprise vector and scalar attributes;
segmenting the 3D coarse model into a series of two-dimensional (2D) simulation segments by defining one or more separation distances, wherein the 2D simulation segments are oriented parallel to each other, are perpendicular to a viewing perspective and are separated by the one or more separation distances;
projecting simulation data of the coarse fire simulation into the 2D simulation segments to form respective 2D input simulation data for each 2D segment;
for each 2D simulation segment performing a 2D fluid simulation using the respective 2D input simulation data, wherein the 2D fluid simulation has a second resolution that is finer than the first resolution; and
processing the 2D fluid simulations to produce a detailed fire simulation having a resolution that is higher than the first resolution of the 3D coarse model.

2. The computer-implemented method of claim 1, wherein the one or more separation distances is a single separation distance separating each 2D segment.

3. The computer-implemented method of claim 2, wherein the single separation distance is at most half of a spatial resolution from the viewing perspective.

4. The computer-implemented method of claim 1, wherein the 2D simulation segments are rectangular in shape.

5. The computer-implemented method of claim 1, wherein at least one constraint is applied to the particles of the 3D coarse model.

6. The computer-implemented method of claim 5, wherein the at least one constraint is associated with the conservation of mass.

7. The computer-implemented method of claim 1, wherein the vector attributes include one or more of position and velocity, and the scalar attributes include one or more of radius, fuel, mass, impulse and age.

8. The computer-implemented method of claim 1, wherein individual particles are further defined by a Boolean validity value that indicates whether an individual particle is participating in a simulation at any particular time.

9. The computer-implemented method of claim 1, wherein separately processing the 2D simulations includes using at least one graphics processing unit to process at least one of the 2D simulations and producing at least two images for each 2D simulation.

10. A system, comprising:
a computing device comprising:
a memory for storing a three-dimensional (3D) coarse model that represents particles used in a coarse fire simulation at a first resolution, wherein individual particles in the model comprise vector and scalar attributes; and
a graphics refiner configured to:
receive the 3D coarse model;
segment the 3D coarse model into a series of two-dimensional (2D) segments by defining one or more separation distances, wherein the 2D simulation segments are oriented parallel to each other and perpendicular to a viewing perspective, and are separated by the one or more separation distances;
project simulation data of the coarse fire simulation into the 2D simulation segments to form respective 2D input simulation data for each 2D segment;
for each 2D simulation segment perform a 2D fluid simulation using the respective 2D input simulation data, wherein the 2D fluid simulation has a second resolution that is finer than the first resolution; and
process the 2D simulations to produce a detailed fire simulation having a resolution that is higher than the first resolution of the 3D coarse model.

11. The system of claim 10, wherein the one or more separation distances is a single separation distance separating each 2D segment.

12. The system of claim 11, wherein the single separation distance is at most half of a spatial resolution from the viewing perspective.

13. The system of claim 10, wherein the 2D simulation segments are rectangular in shape.

14. The system of claim 10, wherein at least one constraint is applied to the particles of the 3D coarse model.

15. The system of claim 14, wherein the at least one constraint is associated with the conservation of mass.

16. The system of claim 10, wherein the vector attributes include one or more of position and velocity, and the scalar attributes include one or more of radius, fuel, mass, impulse and age.

17. The system of claim 10, wherein individual particles are further defined by a Boolean validity value that indicates whether an individual particle is participating in a simulation at any particular time.

18. The system of claim 10, wherein processing the 2D simulations includes producing at least two images for each 2D simulation.

19. A computer program product tangibly embodied in a non-transitory information carrier and comprising instructions that when executed by a processor perform a method comprising:
receiving a three-dimensional (3D) coarse model that includes particles used in a coarse fire simulation at a first resolution, wherein individual particles in the model comprise vector and scalar attributes;
segmenting the 3D coarse model into a series of two-dimensional (2D) segments by defining one or more separation distances, wherein the 2D simulation segments are oriented parallel to each other and perpendicular to a viewing perspective, and are separated by the one or more separation distances;
projecting simulation data of the coarse fire simulation into the 2D simulation segments to form respective 2D input simulation data for each 2D segment;
for each 2D simulation segment performing a 2D fluid simulation using the respective 2D input simulation data, wherein the 2D fluid simulation has a second resolution that is finer than the first resolution; and
processing the 2D fluid simulations to produce a detailed fire simulation having a resolution that is higher than the first resolution of the 3D coarse model.

20. The computer program product of claim 19, wherein the one or more separation distances is a single separation distance separating each 2D segment.

21. The computer program product of claim 20, wherein the single separation distance is at most half of a spatial resolution from the viewing perspective.

22. The computer program product of claim 19, wherein the 2D simulation segments are rectangular in shape.

23. The computer program product of claim 19, wherein at least one constraint is applied to the particles of the 3D coarse model.

24. The computer program product of claim 23, wherein the at least one constraint is associated with the conservation of mass.

25. The computer program product of claim 19, wherein the vector attributes include one or more of position and velocity, and the scalar attributes include one or more of radius, fuel, mass, impulse and age.

26. The computer program product of claim 19, wherein individual particles are further defined by a Boolean validity value that indicates whether an individual particle is participating in a simulation at any particular time.

27. The computer program product of claim 19, wherein processing the 2D simulations includes using at least one graphics processing unit to process at least one of the two-dimensional simulations and producing at least two images for each 2D simulations.

* * * * *